Oct. 24, 1950 W. O. TEETERS 2,526,913
HYDROGENATION OF NITROXYLENE TO PRODUCE XYLIDINE
Filed July 12, 1946
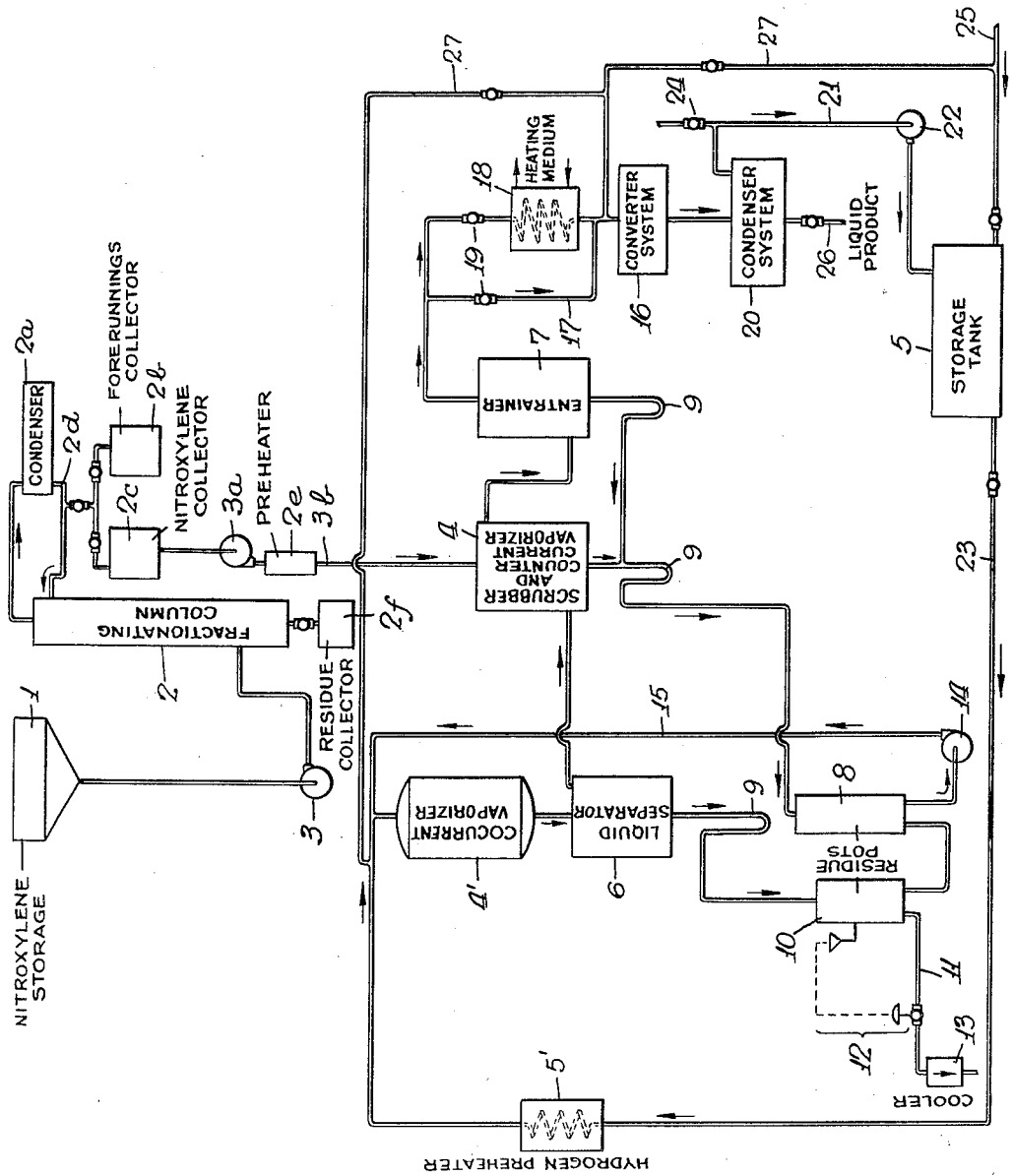
INVENTOR
Wilber O. Teeters
BY
Benjamin Sweedler
ATTORNEY

Patented Oct. 24, 1950

2,526,913

UNITED STATES PATENT OFFICE 2,526,913

HYDROGENATION OF NITROXYLENE TO PRODUCE XYLIDINE

Wilber O. Teeters, River Edge, N. J., assignor to Allied Chemical & Dye Corporation, New York, N. Y., a corporation of New York Application July 12, 1946, Serial No. 683,045

3 Claims. (Cl. 260—580)

The invention described herein is subject to a license to the Government of the United States.

This invention relates to production of xylidine by vapor phase catalytic hydrogenation of nitroxylene.

Among the objects of this invention is to provide a new and particularly advantageous method of producing xylidine by vapor phase catalytic hydrogenation of nitroxylene employing crude nitroxylene of the type readily available commercially as a source of the nitroxylene hydrogenated, which method does not involve undue explosion hazard and materially minimizes fouling of the catalyst and the vaporizer equipment, if not substantially completely eliminating such fouling.

Other objects and advantages of this invention will be apparent from the following detailed description thereof.

The prior art describes vapor phase catalytic hydrogenation of nitro compounds such as nitrobenzene employing as catalyst various metals such as nickel, cobalt, copper, iron, tin or silver. The reaction mixture for such processes is generally prepared by vaporizing the nitro compound, e. g., nitrobenzene in a stream of hydrogen. Since the prior art work has been limited almost exclusively to nitrobenzene hydrogenation, information, if any, on how a crude nitro compound may be employed for vapor phase catalytic hydrogenation can not be relied upon to determine the conditions under which crude nitroxylene may be employed for production of xylidine by vapor phase catalytic hydrogenation.

In the processes of the prior art it has been customary, because of the readiness with which hydrogenation catalysts are poisoned, to employ only a substantially pure nitro compound prepared by carefully purifying the commercially available nitro compound. In the case of crude nitroxylene, purification treatments suggested to minimize or avoid explosion hazards have involved washing the crude with alkali or filtration of the crude, usually through filtering clays, or a combination of both procedures. In all cases to the best of my knowledge, the purification treatments produced nitroxylene which when passed in the vapor phase with hydrogen over a hydrogenation catalyst, such as a nickel catalyst (under conditions similar to those described in the examples described herein) invariably resulted in the fouling of the catalyst after operation for a relatively short period of time of the order of 4 hours and sometimes less.

In the commercial production of nitroxylene by nitration of a commercial grade of xylene including xylenes from coal tar and petroleum sources some proportion of polynitrated xylenes normally is produced. Thus analysis of various lots of crude commercial mixed mononitroxylenes has shown the presence of from about 1% to more than 10% by weight of polynitro compounds consisting principally of mixed dinitroxylenes which are sufficiently volatile at the temperature required for preparation of mononitroxylene-hydrogen vapor mixtures suitable for commercial scale nitroxylene hydrogenation to be present in appreciable proportions in such mixture. Such crude commercial nitroxylenes frequently contain alkali-soluble materials, e. g., nitrophenols and materials which remain as a tarry residue upon total distillation in a stream of inert gas, including polymerization products of polynitroxylenes and alkali-soluble materials and also sulfur bodies which materials are hereinafter referred to as tarry residue materials. All percentages herein are by weight.

I have found that the presence of polynitroxylenes, in excess of about 2%, alkali-soluble materials in excess of about .1%, or tarry residue materials in excess of about .1%, in nitroxylenes results in fouling of the vaporizer equipment and of the hydrogenation catalysts when such nitroxylenes are vaporized in heretofore known vaporization equipment and the resultant vapors admixed with hydrogen are passed over hydrogenation catalysts. I have further found that by subjecting the crude nitroxylene to a purification treatment to remove such impurities or to reduce their content below the limits hereinabove stated followed by vaporization of the thus purified nitroxylene in contact with hydrogen to produce a gaseous mixture of hydrogen and mononitroxylene vapor and the passage of this gaseous mixture over a hydrogenation catalyst, fouling of the catalyst and of the vaporizer equipment is materially reduced, if not completely eliminated.

Preferably the elimination or reduction of such impurities is effected by subjecting the crude mononitroxylene prior to vaporization to a distillation treatment under vacuum of at least 200 mm. of mercury at the top of the fractionating column in which the distillation is conducted. Surprisingly I have found, that the mononitroxylene may be purified under these conditions without danger of explosions taking place.

The crude nitroxylene employed in the process of my invention may be the commercial nitroxylene obtained by nitrating xylene of either petroleum or coal tar origin. It consists primarily of one or more mononitroxylenes and generally from 3% to 10% impurities including polynitrated material, e. g., dinitroxylenes, alkali-soluble materials, e. g., nitrophenols and tarry residue materials. The mononitroxylene component of the crude nitroxylenes commercially available is generally a mixture of several isomeric mononitroxylenes. This crude is subjected to distillation under vacuum at a pressure of at least 200 mm. of mercury at the top of the column, preferably a pressure of 23 mm. of mercury at the top of the column. As a precaution, steam should be used as the heating medium to avoid the possibility of decomposition and the hazard of explosion which might otherwise result from high wall temperatures in the distillation equipment. The initial fraction which consists of water and hydrocarbons is separately collected, collection of this fraction being terminated when 5% by volume thereof distills off at 210° C., this is determined by periodically subjecting samples of the distillate to distillation tests as well known in the distillation art. The second fraction is separately collected and consists of the mononitroxylene; collection of this fraction is terminated when it has a dry point of 265° C., determined by periodically subjecting samples thereof to distillation to ascertain their dry points. The steam pressure employed for indirect heating during the distillation preferably does not exceed 225 pounds per square inch gauge. Approximately 90% of the crude material distilled may thus be vaporized and condensed to produce the desired purified mononitroxylene employed in the catalytic hydrogenation treatment.

The mononitroxylene produced, as hereinabove described, if cooled to a temperature below 100° C. may be preheated to a temperature within the range of 100° to 200° C. preferably 190° to 200° C., before use. This mononitroxylene is vaporized in an atmosphere of hydrogen while subjecting it to elevated temperatures not exceeding about 230° C. The vaporization residue formed when it is desired to discharge some or any desired portion thereof to the atmosphere is cooled to below 100° C. before exposure to air to minimize explosion hazards.

The purified mononitroxylene produced as hereinabove described may be vaporized by any conventional method and admixed with hydrogen to produce a gaseous mixture of nitroxylene and hydrogen for passage over a hydrogenation catalyst. Preferably however the gaseous mixture of nitroxylene and hydrogen is prepared in a multistage vaporization system in which liquid mononitroxylene residue is first contacted with hydrogen in equipment arranged for complete wetting of all heat exchanger surfaces with liquid residue, liquid is separated from the resulting vapor containing hydrogen stream, this gas stream is then subjected to countercurrent scrubbing, accompanied by additional vaporization, with fresh liquid nitroxylene, the liquid from the scrubbing equipment is employed for first contact with additional hydrogen and the scrubbed hydrogen vapor mixture is conducted through an entrainment separator and superheater to the hydrogenation converter train. Liquid mononitroxylene residue may be recirculated, if desired, through the second stage, the nitroxylene residue from the first stage being added to that recirculated through the second stage in which case residual liquid is periodically or continuously withdrawn to keep the system in balance with respect to accumulation of impurities in the recycled residue. The residual liquid is cooled to below 100° C. prior to exposure to the atmosphere.

Scrubbing of the hydrogen nitroxylene vapor mixture with the liquid nitroxylene in the first stage is preferably effected in a countercurrent scrubber and vaporizer in which the vapor leaves the scrubber at the top where the nitroxylene enters, at which point in the scrubber both the liquid and the vapor contain the smallest proportion of dinitroxylene and the vapors in equilibrium with liquid nitroxylene-dinitroxylene mixture at temperatures of about 200° C. contain from about one-quarter to one-fifth as much dinitroxylene as the liquid. A vapor stream low in dinitroxylene is thus produced, with consequent minimizing of the tendency to foul the catalyst and thus shorten its life. The liquid nitroxylene introduced in the combined scrubber and vaporizer serve to flush heat exchange surfaces therein free from deposits which may be explosive and which separate out during vaporization of the nitroxylene. While it is preferred to employ countercurrent flow of nitroxylene and hydrogen nitroxylene in the first stage of the vaporization, it is preferable to employ cocurrent flow in the second stage in which residual liquid is recirculated because it has been found that with the flow of hydrogen and nitroxylene vapor and the residual liquid in cocurrent direction less entrainment of liquid by the vapor stream takes place.

In addition to treatment of the hydrogen and nitroxylene mixture formed in the vaporizer with liquid it is desirable to pass the hydrogen-nitroxylene mixture withdrawn from contact with the liquid through entraining means to precipitate liquid droplets contained therein. Such entrainment means may consist of a series of baffles, a packed tower, or other means where solid surfaces cause the hydrogen-nitroxylene mixture to take a tortuous path. A packed tower has been found to be particularly advantageous for this purpose. Such a tower may be of the same type generally employed for countercurrent gas and liquid contact, but without a supply of liquid for contact with the gas stream.

The hydrogen-nitroxylene vapor mixture prepared as above described may be reacted over a nickel catalyst consisting of nickel or nickel oxide supported, if desired, on a pumice base. Such catalyst may be made, for example, by impregnating clean pumice with molten nickel nitrate, draining the impregnated pumice, decomposing the nitrate to produce nickel oxide by heating in a stream of air and reducing the nickel oxide at least in part to metallic nickel by further heating in hydrogen. Other methods of preparing nickel hydrogenation catalysts have been described in the art and may be employed. The term "nickel catalyst" as used herein is intended to include both supported and unsupported catalysts in which metallic nickel is an essential catalytic ingredient; this includes catalysts in which the originally present reducible nickel compound such as nickel oxide is only partially converted to metallic nickel either before use or during use.

Instead of nickel catalysts copper chromium oxide catalysts promoted or unpromoted and, if desired, supported on an inert carrier such as pumice or in the form of pellets with or without a diluent material may be employed. For example, pellets of copper chromium oxide diluted with alumina as disclosed in my copending application Serial No. 556,774 (now abandoned) may be utilized. Other known hydrogenation catalysts such, for example, as those described in Sabatier-Reid's book on "Catalysis in Organic Chemistry" may be used instead of the nickel catalyst or the copper chromium oxide catalysts hereinabove described.

When using a nickel catalyst the reaction is carried out under a superatmospheric pressure of at least 5 and preferably at least 7 atmospheres while maintaining a temperature in the range of about 200° to 400° C., preferably in the range of about 225° to 330° C. in the catalytic reaction zone. The upper limit of pressure is not critical, being dependent chiefly on the practical mechanical limits of available equipment. The lower limit of at least 5 atmospheres and preferably at least 7 atmospheres, however, is important for obtaining the combination of high efficiency, high throughput and extremely low ring hydrogenation. Working pressures up to 20 atmospheres are generally quite advantageous and convenient, and pressures in the range of 10 to 15 atmospheres are most advantageous. Unless otherwise specified absolute pressures are referred to herein.

With respect to the temperature of the catalyst bed, although small portions thereof may at times be at temperatures below 200° or above 400° C. during the operation, a temperature within the range of about 200° to about 400° C. should be found at some point in the hydrogenation zone, and preferably no substantial part of the hydrogenation zone should remain at a temperature above 400° C. for any substantial period of time. The reaction proceeds most advantageously when the mean hydrogenation zone temperature is substantially maintained within the range of 225° to 330° C.

In order to obtain high productivity and long catalyst life the volume of hydrogen gas employed should be sufficiently high, with respect to the nitroxylene vaporized and mixed therewith that the nitroxylene hydrogen gas mixture remains substantially above its nitroxylene dew point, preferably at least 5° to 10° above its dew point in the catalyst bed. This will, of course, require a larger volume of hydrogen gas relative to nitroxylene, when operating in the lower part of the temperature range, than will be required when operating in the upper part of the temperature range. Generally the employment of at least 7 cu. ft. of hydrogen, measured at room temperature and the working pressure per pound of nitroxylene vaporized will give satisfactory results. Large excesses of hydrogen are not harmful, in fact a large gas volume aids in temperature control, and volumes up to 77 cu. ft. of hydrogen per pound of nitroxylene vaporized may be used. From 7 to 40 cu. ft. of hydrogen, measured at room temperature and the working pressure per pound nitroxylene vaporized is preferred. When sufficient hydrogen gas is employed to maintain a high dew point, as indicated, and to facilitate temperature control the amount employed will always be well above the stoichiometric quantity required for reaction with the nitroxylene.

In carrying out the reaction it is desirable to maintain an apparent time of contact in the range of .1 to 5 seconds, preferably within the range of .3 to 3 seconds. For most advantageous operation the longer contact times are used with the lower operating temperatures and the shorter times with the higher temperatures. The apparent contact time may be defined as the bulk volume of catalyst employed divided by the volume of gaseous reaction mixture fed per second measured at the mean catalyst temperature and the working pressure. Since the gaseous reaction mixture is composed very largely of hydrogen on a volume basis, for practical purposes the volume of hydrogen at the temperature and pressure indicated, may be used in calculating the apparent contact time.

When employing copper chromium oxide and other hydrogenation catalysts conditions in general may be the same as hereinabove described in connection with the use of nickel catalysts. Preferably, however, when using copper chromium oxide catalysts the converter pressure is maintained at about 11 atmospheres and the contact time used is preferably from .5 to 5 seconds.

In the accompanying drawing forming a part of this specification the single figure shows a preferred layout of apparatus for practicing the process of this invention; it will be understood the invention is not limited to the practice of the process in the equipment diagrammatically illustrated in the drawing.

Referring to the drawing liquid nitroxylene of commerce is pumped from storage tank 1 to a fractionating column 2 by means of a pump 3 or otherwise. The top of fractionating column 2 communicates with a condenser 2a which in turn communicates with a pair of collectors, namely, collector 2b for collecting the forerunnings consisting chiefly of water and hydrocarbons, and collector 2c for collecting the nitroxylene. The condenser 2a is provided with a reflux return line 2d. During the initial stages of the operation of the fractionating column the reflux ratio employed therein is preferably 9 to 1, i. e., approximately 9 volumes of condensate are returned to the fractionating column for each volume collected in the forerunning collector 2b. When the collection of forerunnings is interrupted, determined as above pointed out when 5% by volume of a sample thereof distills off at 210° C., nitroxylene is collected in collector 2c. The reflux ratio employed during the collection of this fraction is preferably 1 to 1. The collection of nitroxylenes is interrupted, as above pointed out, when the nitroxylene has a dry point of 265° C.

From the nitroxylene collector 2c the nitroxylene is pumped by a proportioning pump 3a through preheater 2e and line 3b to the countercurrent vaporizer 4. Pump 3a regulates the amount of liquid nitroxylene employed in the process and serves to bring the liquid nitroxylene up to the working pressure maintained in the entire system which in the preferred operation is about 10 atmospheres. This pump, as above indicated, forces the liquid into the first stage of the vaporizer system, namely, the scrubber and countercurrent vaporizer 4.

Hydrogen is passed from storage tank 5 through a preheater 5' to the second stage of the vaporizer system, namely, the cocurrent vaporizer 4'. The hydrogen and liquid nitroxylene may desirably be fed to the vaporization system in the proportion of 6 to 20, preferably 6 to 15 cu. ft. hydrogen, measured at room temperature and the working pressure per pound of nitroxylene vaporized.

The vaporizer system in the preferred form illustrated contains four units. The first of these is the cocurrent vaporizer 4' which may advantageously consist of a bank of vertical tubes through which, when this unit is in operation, the nitroxylene residue and hydrogen pass cocurrently downwards. The second unit is the liquid separator 6 through which the predominantly gaseous hydrogen nitroxylene mixture from vaporizer 4' passes and which serves to separate unvaporized liquid, preferably by means of baffles around which the gaseous stream passes. The third unit of the vaporizer system illustrated is the countercurrent vaporizer 4 which may advantageously be in the form of a packed tower in which the gaseous stream passes upwardly and nitroxylene distillate flows downwardly. The fourth unit is the entrainer 7 which may also advantageously be in the form of a packed tower without provision for an entering liquid stream. This unit may be heated by steam or otherwise. The predominantly gaseous stream passes upwardly through this tower where the fog is dissipated and entrained liquid droplets are removed. All unvaporized liquid draining from unit 4 and liquid separated in entrainer 7 passes into residue pot 8 through mains provided with liquid seals 9. Liquid separated in separator 6 passes through a main provided with a liquid seal 9 into residue pot 10 which is communicably connected with residue pot 8. Residue pot 10 is equipped with a residue conduit 11 and with an automatic level control 12 of any well known type, and communicates with a cooler 13 which cools the residue withdrawn to 180° C. or lower before it is exposed to the air. From the residue pot 8 a part of this residual is recirculated by pump 14 through recirculation main 15 to cocurrent vaporizer 4'.

Heat for vaporization may be supplied either by heating the vaporizers 4 and 4', or by preheating the hydrogen and liquid nitroxylene, or both. Thus, when vaporizer 4' is in the preferred form of a bank of vertical tubes, these are readily heated by mounting them within a housing through which heating medium may circulate. Similarly, when vaporizer 4 is in the form of a packed tower it may be heated by a jacket around the tower or by heating conduits within the packing. In preferred operation, the hydrogen is preheated to a temperature of 190° to 200° C. in preheater 5', the nitroxylene is preheated in preheater 2e to a temperature of about 190° to 200° C., and additional heat is provided as above indicated either in vaporizer 4 or in vaporizer 4'. Sufficient heat is thus provided to vaporize up to about 85%–98% of the mononitroxylene component of the nitroxylene distillate fed to vaporizer 4 and to produce a hydrogen-nitroxylene gaseous reaction mixture at a temperature of about 185° to 200° C., containing from 6 to 20, preferably 6 to 15, cu. ft. hydrogen (measured at room temperature and at the working pressure) per pound of nitroxylene vaporized. The mixture on leaving entrainment separator 7 may have a temperature of about 188° to 200° C.

When operating in accordance with my invention substantially complete vaporization of the nitroxylene may be effected by passage thereof through the scrubber and countercurrent vaporizer 4 followed by flow of the residue from this unit through the cocurrent vaporizer 4' so that it is unnecessary to recirculate the residue from 4' through this unit; the residue from this unit being simply passed through cooler 13 to the atmosphere. If it is desired, however, to recirculate the residue from cocurrent vaporizer 4' through this unit, a substantial proportion of the residual liquid may be withdrawn from residue pot 10 to avoid the build-up of undesirable high-boiling impurities in this liquid. In general from 1% to 50%, preferably 1% to 10%, liquid may thus be withdrawn, the remaining 50% to 99%, preferably 90% to 99%, being recirculated through cocurrent vaporizer 4'.

The gaseous reaction mixture from the vaporizer system may be passed directly to the converter system 16 through valved conduit 17, or may first be passed through vapor superheater 18 by proper adjustment of valves 19, and thence to converter system 16. Additional hydrogen may be added to this gaseous reaction mixture through lines 25, 27, if desired.

The converter system generally contains one or more catalyst chambers which may be in the form of tubes, for example, packed with a pumice-supported nickel catalyst, or packed with other catalysts as above described. The converter tubes may advantageously be contained within a shell suitable for circulation of cooling or heating medium as described, for example, in Wroby Patent 2,355,938, issued August 15, 1944. When the desired conversion has taken place the reaction gases are promptly withdrawn from converter system 16 and passed to condenser system 20 where the xylidine product, the water of reaction, and any other normally liquid material is condensed out and cooled; the xylidine product being withdrawn through the valve controlled pipe line 26. The non-condensible gas withdrawn through conduit 21 generally consists substantially of unreacted hydrogen and may be recirculated by blower 22 to tank 5 and thence through valved conduit 23 leading to cocurrent vaporizer 4' and reused in the process of the invention. Should there be substantial accumulation of inert gases, it is desirable to bleed off a portion of the non-condensible gas through valved conduit 24, which is provided with two valve controlled branches one of which communicates with the atmosphere for discharge of the inert gases, and the other of which (not shown) communicates with the valve controlled line 27 for supplying additional hydrogen to the system when desired.

In preferred operation, the heaters, the vaporizer system, the converter system, the condenser system and all connecting piping are maintained under the working pressure which, as above stated, is preferably about 10 atmospheres.

The following examples are illustrative of the process of this invention; it will be understood the invention is not limited to these examples.

In all examples the catalyst used consisted of a pumice support having 20% by weight of nickel oxide deposited thereon, the catalyst being reduced by passing hydrogen thereover. In Example 1 and the test made for comparative purposes under Example 1, .01 cu. ft. of catalyst was employed in the converter; in Example 2, 1.5 cu. ft. of catalyst was employed in the converter.

EXAMPLE 1

Nitroxylene of commercial quality was first subjected to distillation in a steam-heated still under a vacuum of 23 mm. of mercury at the top of the fractionating column, the forerunnings consisting of water and hydrocarbons were separately collected and then 60% of the total charge was collected as distillate. This distillate fraction was completely vaporized employing from 9 to 30 cu. ft. of hydrogen (measured at the working pressure of 150 pounds per square inch gauge and room temperature) per pound of nitroxylene vaporized. Vaporization was effected by cocurrent flow of the liquid nitroxylene and preheated hydrogen through a heated pipe. 70 pounds of the distillate fraction was thus vaporized per hour per cubic foot of catalyst and the nitroxylene vapor hydrogen mixture passed over the catalyst in the converter; the contact time during the run varied from 1 to 3.5 seconds. All of the nitroxylene distillate fraction was vaporized, i. e., no residue was formed in the vaporizer equipment. The temperature of the catalyst was within the range of 160° to 328° C. and the converter pressure, as above noted, was 150 pounds per square inch gauge. The run was continued for 8.5 hours resulting in substantially complete conversion of the nitroxylene to xylidine. At the end of the run the catalyst was inspected and found to be clean and highly active.

*Comparative test*

A like run was made using the same amount and type of catalyst and the same working pressure in which run 50 pounds of the same commercial grade of nitroxylene was vaporized per hour per cubic foot of catalyst without, however, subjecting this nitroxylene to preliminary fractional distillation. From 18 to 46 cu. ft. of hydrogen, measured at the working pressure and room temperature, was used in this run per pound of vaporized nitroxylene and the contact time was from 1 to 2 seconds. At the end of 7 hours the catalyst was found to be fouled with tar.

EXAMPLE 2

In this example, nitroxylene of commerce was subjected to fractional distillation under a vacuum of 23 mm. of mercury at the top of the fractionating column removing as nitroxylene distillate 88% of the total charge introduced into the fractionating column. The nitroxylene fraction thus obtained was vaporized employing 9 to 14 cu. ft. of hydrogen, measured at the working pressure and room temperature per pound of vaporized nitroxylene, the resultant nitroxylene-hydrogen vapor stream passed over the catalyst, the mean temperature of which was 285° C. The pressure maintained in the converter was within the range of 150 to 200 pounds per square inch gauge and the contact time from .3 to 1.1 seconds. This run lasted for 157 hours and resulted in substantially complete conversion of nitroxylene to xylidine for the first 115 hours; conversion then gradually decreased. At the end of the run the catalyst was examined and found to be clean. In none of the examples did any explosions, even of a minor character, take place.

Since certain changes may be made in carrying out the above process without departing from the scope of the invention, it is intended that all matter contained in the above description shall be interpreted as illustrative and not in a limiting sense.

What is claimed is:

1. A vapor phase process for hydrogenation of crude mononitroxylene to xylidine which comprises subjecting said crude to vacuum distillation under a pressure below 200 mm. mercury maintained at the top of the fractioning column to drive off a purified mononitroxylene containing not more than 2% polynitroxylenes, not more than .1% alkali-soluble materials in the vapor phase, condensing said vapors, and not more than .1% tarry residue materials, passing the thus purified nitroxylene condensate in contact with hydrogen to revaporize it and produce a gaseous mixture of hydrogen and nitroxylene vapor and passing such gaseous mixture over a hydrogenation catalyst.

2. A vapor phase process for hydrogenation of crude mononitroxylene to xylidine which comprises subjecting said crude to vacuum distillation under a pressure below 200 mm. mercury maintained at the top of the fractionating column to drive off a purified mononitroxylene containing not more than 2% polynitroxylenes, not more than .1% alkali-soluble materials in the vapor phase, condensing said vapors, and not more than .1% tarry residue materials, passing the thus purified nitroxylene condensate in contact with hydrogen while imparting sufficient heat to the condensate to vaporize it and form a predominantly gaseous hydrogen-nitroxylene mixture and while maintaining the temperature to which the nitroxylene is subjected during said heating at not exceeding about 230° C., then passing said gaseous mixture over a nickel catalyst maintained at a temperature within the range of 200° to 400° C., the vapor stream passed over said catalyst being under a pressure of at least 5 atmospheres but not exceeding about 20 atmospheres.

3. The process for production of xylidine by vapor phase catalytic hydrogenation of nitroxylene which comprises the following steps: step (1) subjecting crude liquid nitroxylene to vacuum distillation in a fractionating column under a pressure not exceeding 200 mm. mercury at the top of said column to drive off a purified mononitroxylene containing not more than 2% polynitroxylenes, not more than .1% alkali-soluble materials in the vapor phase, step (2) condensing said vapors, and not more than .1% tarry residue materials, step (3) passing the thus purified nitroxylene condensate downwardly in countercurrent contact with a rising hydrogen-nitroxylene vapor stream over a heat exchange surface and so as to completely wet said surface while imparting sufficient heat to the nitroxylene condensate to vaporize only a portion thereof and form a predominantly gaseous nitroxylene-hydrogen mixture and while maintaining the temperature to which the nitroxylene condensate is subjected during said heating at not exceeding about 230° C., step (4) withdrawing unvaporized residual condensate from step 3, step (5) passing the residual condensate from step 4 in cocurrent flow with hydrogen over a heat exchange surface and so as to completely wet said surface while imparting sufficient heat to the residual condensate to vaporize only a portion thereof and form a predominantly gaseous hydrogen-nitroxylene mixture which is employed in step 3 while maintaining the temperature to which the nitroxylene condensate is subjected during said heating at not exceeding about 230° C., and step (6) passing said gaseous mixture produced in step 3 under pressure of at least 7 atmospheres but not exceeding about 20 atmospheres over a nickel catalyst maintained at a temperature within the range of 225° to 330° C. to produce xylidine.

WILBER O. TEETERS.

REFERENCES CITED

The following references are of record in the file of this patent:

UNITED STATES PATENTS

| Number | Name | Date |
|---|---|---|
| 949,954 | Bedford | Feb. 22, 1910 |
| 2,252,099 | Rosen | Aug. 12, 1941 |
| 2,316,564 | Cockerill | Apr. 13, 1943 |
| 2,402,423 | Mason | June 18, 1946 |

FOREIGN PATENTS

| Number | Country | Date |
|---|---|---|
| 125,140 | Great Britain | Apr. 17, 1919 |

Certificate of Correction

Patent No. 2,526,913                                                              October 24, 1950

WILBER O. TEETERS

It is hereby certified that error appears in the printed specification of the above numbered patent requiring correction as follows:

Column 7, line 27, for "180° C." read *100° C.*; line 29, after the word "residual" insert *liquid*; column 9, lines 65, 66, and 67, and column 10, lines 5, 6, and 7, for "materials in the vapor phase, condensing said vapors, and not more than .1% tarry residue materials," read *materials and not more than .1% tarry residue materials in the vapor phase, condensing said vapors,*; lines 28, 29, 30, and 31, for "materials in the vapor phase, step (2) condensing said vapors, and not more than .1% tarry residue materials," read *materials and not more than .1% tarry residue materials in the vapor phase, step (2) condensing said vapors,*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*